C. E. AKELEY.
METHOD OF BACKING MIRRORS.
APPLICATION FILED MAR. 19, 1919.

1,384,420.

Patented July 12, 1921.

Inventor
Carl E. Akeley

UNITED STATES PATENT OFFICE.

CARL E. AKELEY, OF NEW YORK, N. Y.

METHOD OF BACKING MIRRORS.

1,384,420.　　　　Specification of Letters Patent.　　Patented July 12, 1921.

Application filed March 19, 1919. Serial No. 283,647.

(FILED UNDER THE ACT OF MARCH 3, 1883, 22 STAT. L., 625.)

*To all whom it may concern:*

Be it known that I, CARL E. AKELEY, a citizen of the United States, and a resident of New York city, in the county of New York and State of New York, have invented an Improvement in Methods of Backing Mirrors, of which the following is a specification.

The invention described herein may be used by the Government, or any of its officers or employees in prosecution of work for the Government, or by any other person in the United States without payment of any royalty thereon.

My invention relates to reflectors or mirrors and has for its object to provide a novel means and method of backing for same that is particularly adapted for use in connection with metal mirrors.

Metal mirrors, as previously formed, have usually comprised a reflecting surface, such as silver, and a base composed of material that may be readily deposited upon the silver, such as copper. The usual method of forming such mirrors is to chemically deposit the silver upon a glass form and then to electrolytically deposit a thin layer of copper thereon, after which, the metal mirror is removed from the glass form. Some sort of lacquer is then applied to the silver reflecting surface in order to prevent oxidation or tarnishing.

It is obvious that metal mirrors so formed are much lighter in weight and less expensive than glass mirrors of the same size, since the form for each glass mirror must be carefully ground to insure an optically perfect reflecting surface, whereas, an unlimited number of metal mirrors may be made from a single glass form.

In making metal mirrors of large diameter, however, it has been found that when only a thin base of copper or other metal is provided, the mirror is easily deformed or dented. In order to provide a mirror of sufficient rigidity to be self supporting, it is therefore necessary to deposit the metallic base in a very heavy layer, so that the weight and the cost of the mirror are greatly increased and but little advantage is gained over glass mirrors, as previously formed.

By my invention, I provide a novel form and method of backing for metal mirrors by means of which metal mirrors may be produced that are practically self supporting and may be handled without fear of distorting or otherwise damaging the reflecting surface.

Figures 1, 2:
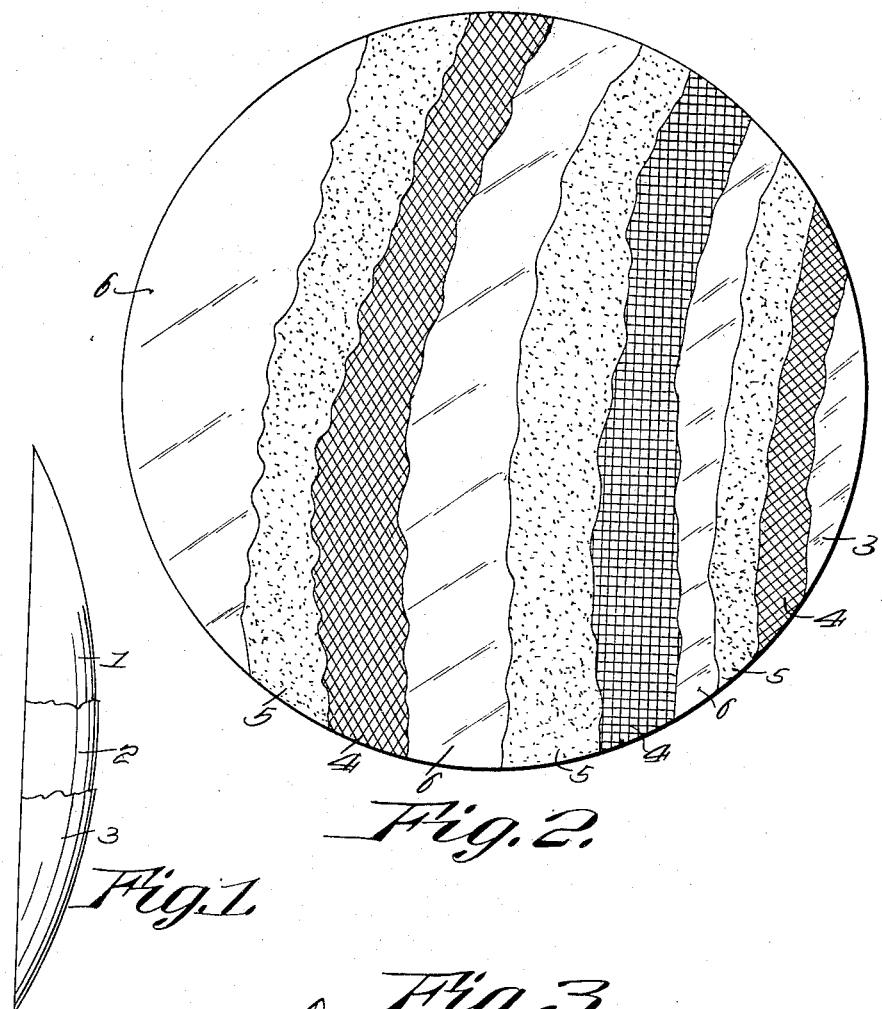
Figure 1 shows the blank form used in producing metal mirrors.
Fig. 2 is a view partially in section and partially in rear elevation of a metal mirror provided with a backing embodying my invention.
Figure 3:
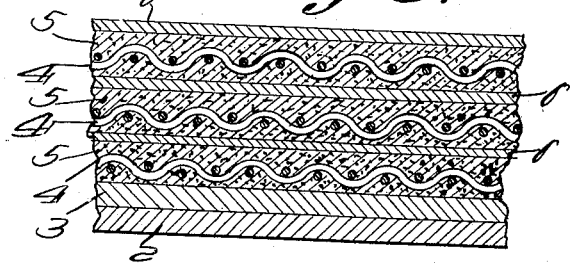
Fig. 3 is a transverse sectional view of a portion of the mirror shown in Fig. 1.

Referring to Fig. 1, in order to produce a metal mirror to which my backing is to be applied, a blank form 1 having the desired shape and size is provided, upon which is deposited, first a metallic reflecting surface 2, such as silver, and then a layer 3 of dissimilar metal, such as copper. The exact method of depositing the metal forms no part of my invention and need not be further discussed herein.

In carrying out my invention, a tough fabric 4, such as wire mesh, is placed upon the convex surface of the metal mirror and is pressed down smoothly to conform to the curvature thereof. Cementitious material 5 is then applied to the fabric 4 and while in a plastic condition is spread over the fabric and is forced into the interstices of the mesh, as shown in Fig. 2, sufficient cementitious material being applied to completely cover the fabric 4. The cementitious material 5 is preferably composed of a mixture of cement and fibrous material, such as asbestos.

A coating 6 of shellac, or any other similar material that is impervious to moisture, is then applied to the cementitious material 5 and after it is dry a second piece of fabric 4 is placed upon the coating 6 with the wires comprising the mesh running in different directions from the wires in the first piece of fabric 4. A second layer of cementitious material 5 is then applied and pressed into the fabric as before, after which, a second coating 6 of shellac is applied. If desired, a third or fourth layer of fabric and cementitious material may be applied to the mirror until a backing of sufficient strength and stiffness is formed. It has been found, however, that two or three layers of wire mesh with the wires forming the mesh running in different directions provide a backing of great strength and rigidity after the cementitious material has been allowed to thoroughly dry and harden. The function of the coatings 6 of moisture-proof material is to allow each layer of cementitious material 5 to dry and harden independently of the other layers, so that any shrinkage or distortion that may occur is confined to individual layers and will not affect the backing, as a whole.

I claim as my invention:

1. The method of backing a fragile metallic reflector which consists in, first laying a tough fabric over the back of said reflector, then covering the fabric with cementitious material and finally applying a coating of material impervious to water to said cementitious material.

2. The method of backing a fragile metallic reflector which consists in, first laying a tough fabric over the back of said reflector, then covering the fabric with cementitious material, then applying a coating of material impervious to water to said cementitious material and finally in applying another layer of fabric and cementitious material over said coating.

CARL E. AKELEY.